March 9, 1965 R. S. ZAPF 3,172,652
WORK-HOLDING DEVICE
Filed Oct. 27, 1961 4 Sheets-Sheet 1
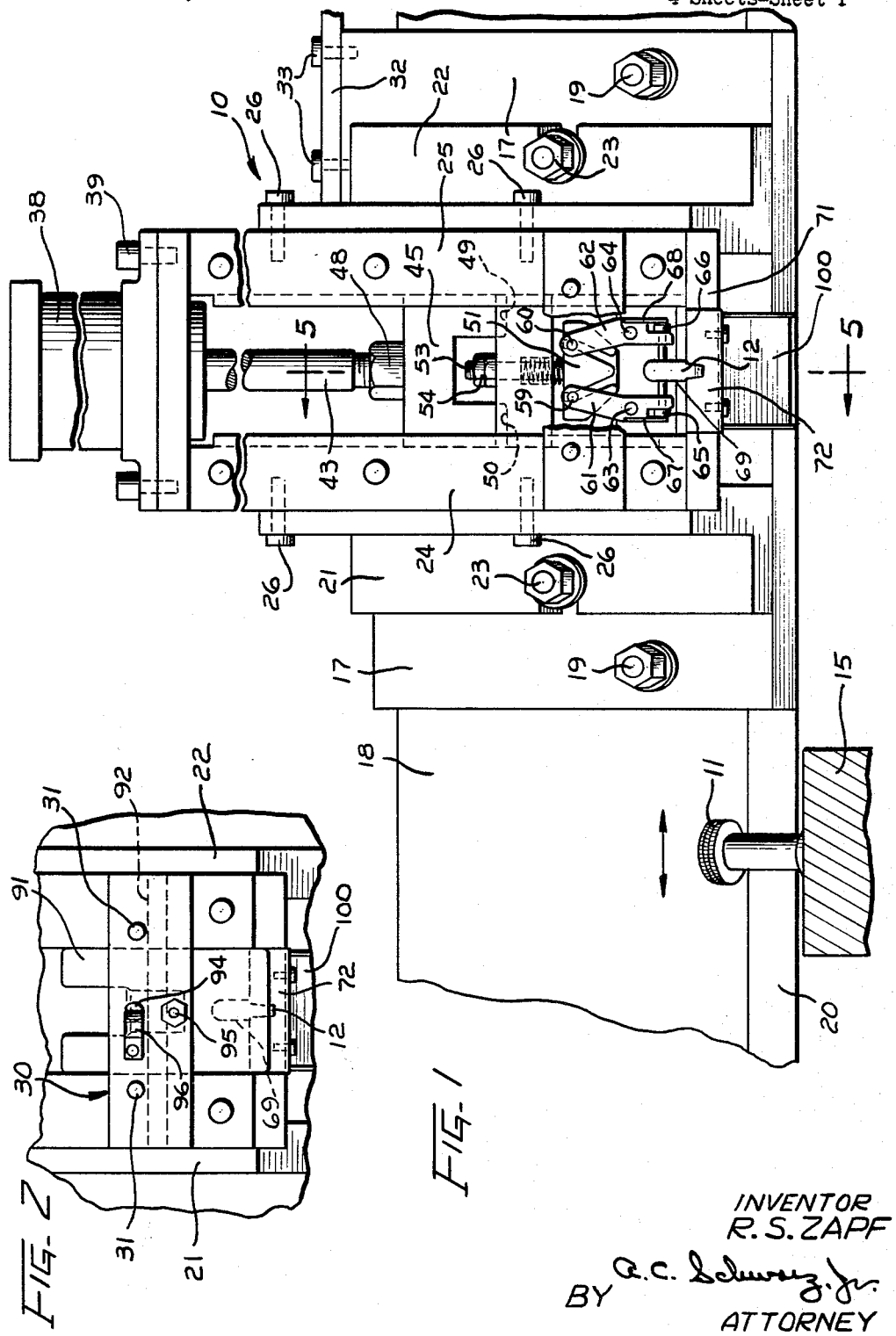
INVENTOR
R. S. ZAPF
BY A.C. Schwarz Jr.
ATTORNEY

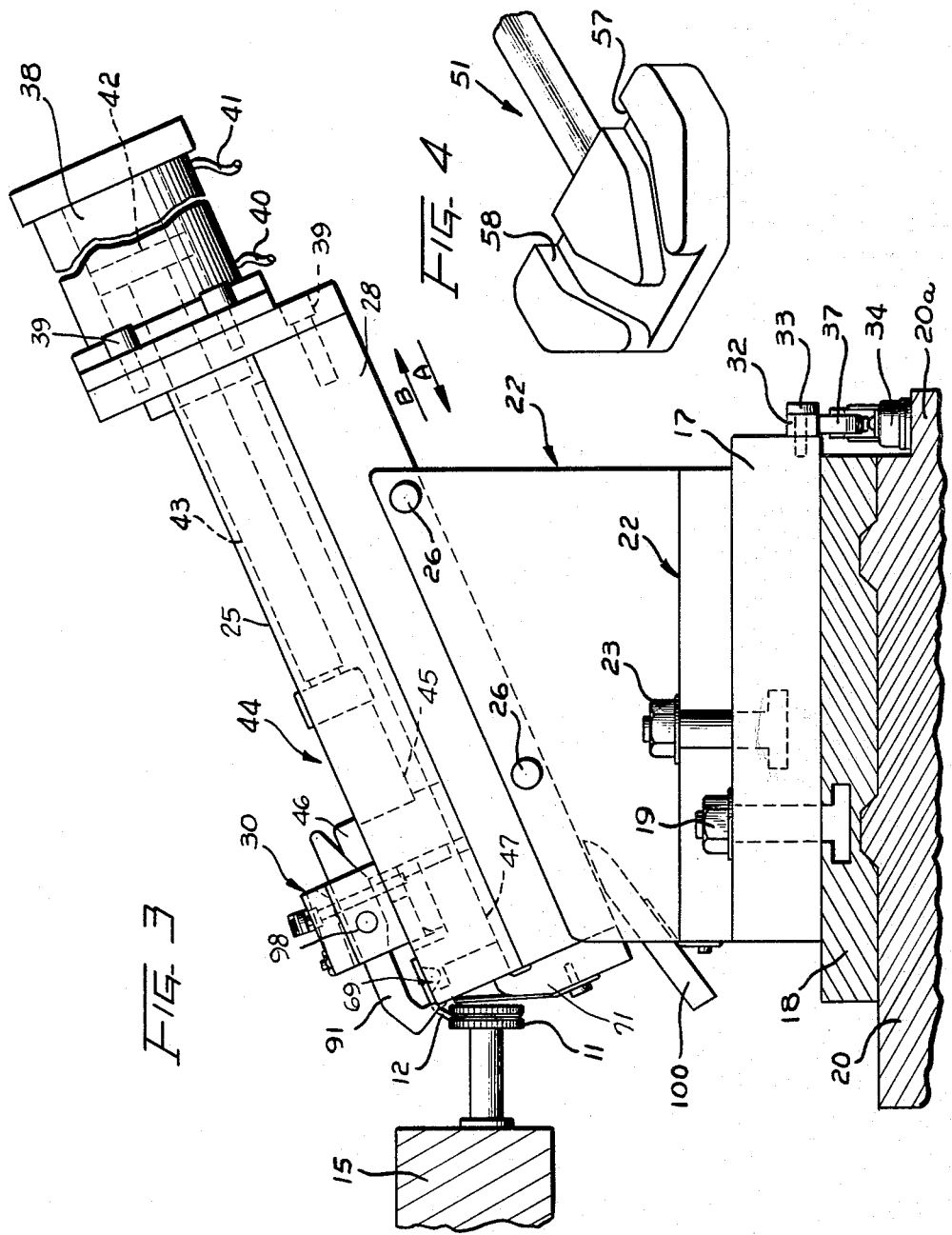

March 9, 1965 R. S. ZAPF 3,172,652
WORK-HOLDING DEVICE
Filed Oct. 27, 1961 4 Sheets-Sheet 3
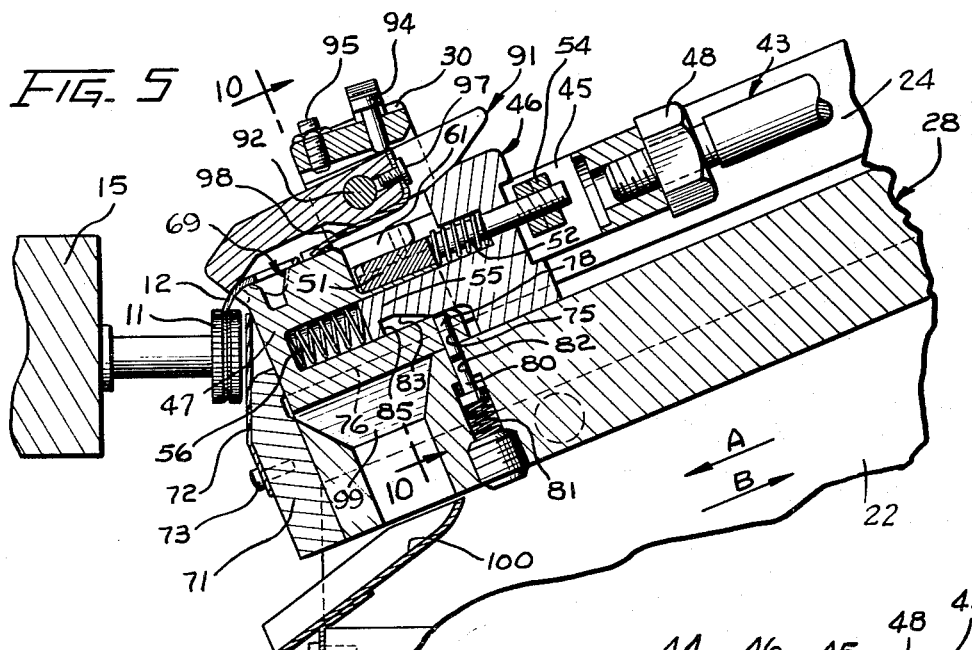
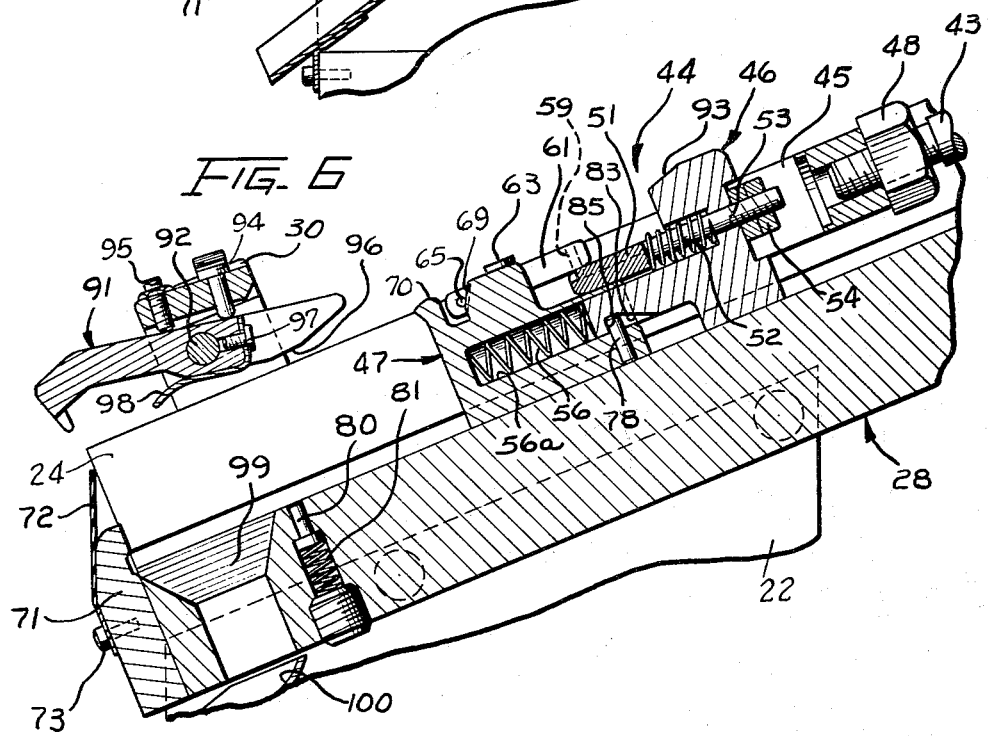
INVENTOR
R. S. ZAPF
BY A.C. Schwarz, Jr.
ATTORNEY

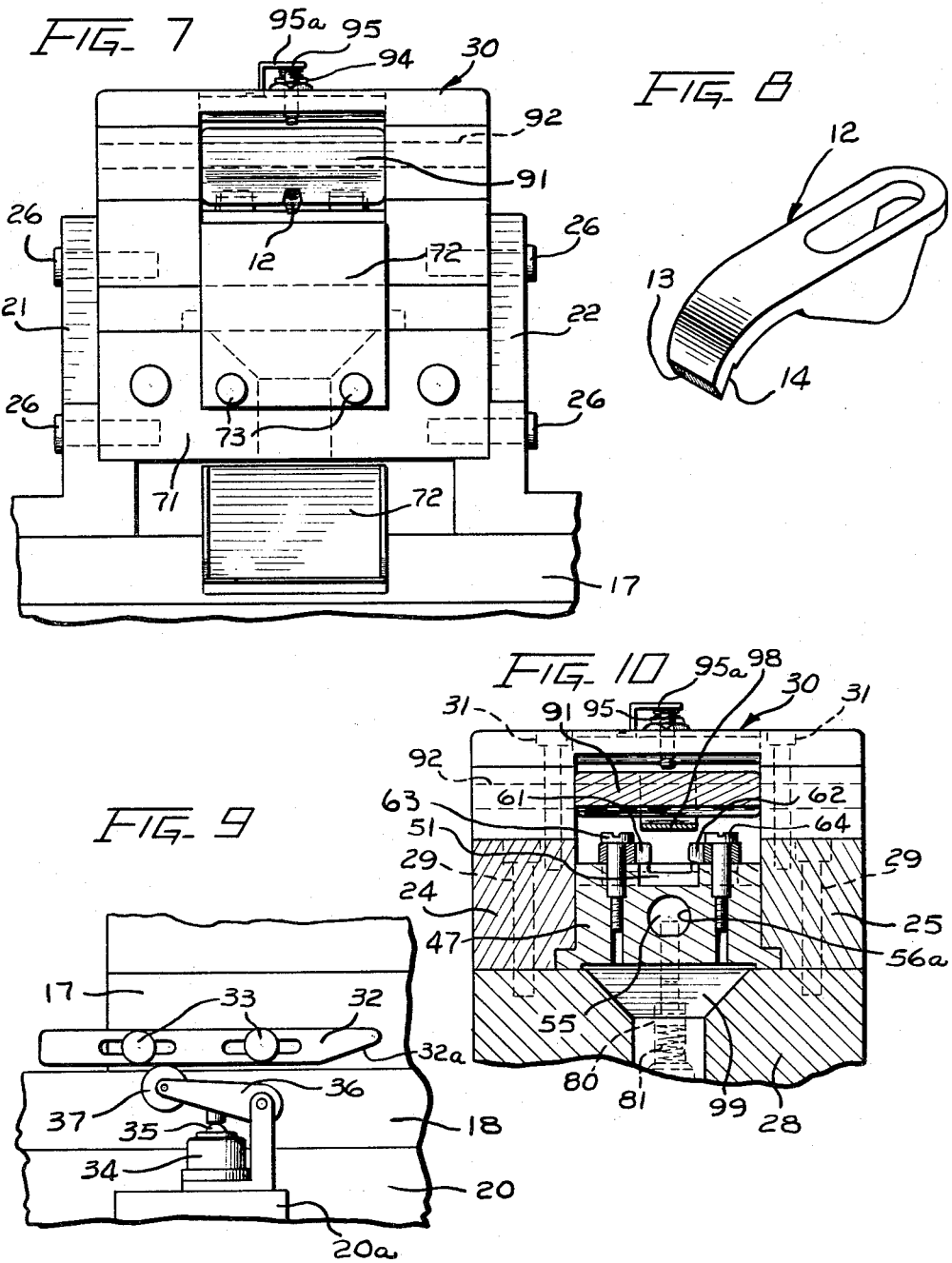

United States Patent Office 3,172,652
Patented Mar. 9, 1965

---

3,172,652
WORK-HOLDING DEVICE
Richard S. Zapf, La Grange, Ill., assignor to Western Electric Company, Incorporated, New York, N.Y., a corporation of New York
Filed Oct. 27, 1961, Ser. No. 148,199
9 Claims. (Cl. 269—58)

This invention relates generally to a work-holding device and more specifically to a work-holding device which, in a single movement, operates to transfer, position and clamp a workpiece in a position where it can be acted upon by a metal removing machine.

Another object of the invention is to provide a work-holding device of the workpiece transfer type capable of being actuated by a single drive member to perform the required functions of transferring, positioning and clamping the workpiece.

More specifically, it is an object of this invention to provide a work-holding device of the type described above which transfers, positions and clamps a workpiece therein; the device being capable of performing these functions upon a single rectilinear movement.

Still another object of this invention is to provide a work-holding device in accordance with the above objects which will also automatically eject a workpiece after completion of a metal removing operation.

According to this invention, a work-holding device is provided which transfers, centers and clamps the workpiece therein on one stroke thereof and releases and ejects the workpiece on the return stroke.

Other objects, advantages and aspects of the invention will appear from the following detailed description of certain specific embodiments thereof, when taken in conjunction with the appended drawings, in which:

FIG. 1 is a plan view of a work-holding device constructed in accordance with this invention with the clamping and ejection members omitted for purposes of clarity, and additionally shows a cutter for removing metal from a workpece presented thereto by the device;

FIG. 2 is a plan view of a portion of the device for supporting the clamping and ejection members shown in FIG. 1;

FIG. 3 is a side view of the device shown in FIG. 1;

FIG. 4 is a detailed perspective of a cam employed to actuate the positioning members of the device;

FIG. 5 is a sectional view taken on lines 5—5 of FIG. 1 and showing the device in the workpiece clamping position;

FIG. 6 is a sectional view of the device showing the machine tool in the loading position;

FIG. 7 is a fragmentary front view of the device shown in FIG. 1;

FIG. 8 is an enlarged perspective of a typical workpiece which is to be presented by the device of this invention to the metal remover;

FIG. 9 illustrates a microswitch and rod for actuating the device at periodic intervals; and FIG. 10 is a sectional view of the device taken on lines 10—10 of FIG. 5.

Referring now to the figures for a more complete understanding of the invention, FIG. 1 illustrates a preferred embodiment of the device 10, constructed in accordance with this invention. For the purpose of illustrating the operation of the device 10, assume that the workpiece to be presented by the device to a stationary rotating cutter 11 is of the form shown in ,and designated generally by, numeral 12 in FIG. 8. Also assume that edges 13 and 14 of the workpiece 12 are to be machined by the cutter 11 supported in a machine head 15. As will be evident from the hereinafter description, the device 10 can be designed to present workpieces of various shapes to any conventional metal remover.

A plate 17, FIGS. 1 and 3, is secured to a machine table or carrier 18 which is slidably mounted on a base 20 for reciprocatory movement by a conventional drive (not shown). Brackets 21 and 22 are secured to the plate 17 by bolts 23. An inclined pair of guide rails 24 and 25 are secured by screws 29 to a base plate 28 which is secured to the brackets 21 and 22 by screws 26 (FIGS. 7 and 10). A substantially U-shaped support 30 is mounted on the top edges of the rails 24 and 25 by screws 31.

The table 18, FIG. 1, reciprocates in the directions indicated by the arrows and thereby reciprocates the device 10 back and forth across cutter 11. A rod 32 of predetermined length, FIGS. 3 and 9, and having a cam surface 32a, is fastened to the edge of the table 18 by means of machine screws 33 and reciprocates with the table so as to actuate microswitch 34 mounted on base extension 20a. The microswitch 34 is of the type which closes an electrical circuit, omitted for the purpose of clarity, each time a pin 35 is depressed, the pin being biased outwardly from the microswitch by a spring (not shown). A roller arm 36 is pivotally mounted to the microswitch 34 and depresses the pin 35 every time the roller 37, rotatably mounted on the arm 36, is engaged by the rod 32. The rod 32 is of such length that the microswitch 34 is actuated by roller 37 riding onto the rod before the workpiece 12 is to be transferred into position with cutter 11 for the metal removing operation.

One element required for effecting the transfer of the workpiece to the cutter comprises a cylinder 38 which is fixed to the ends of the guide rails 24 and 25 and the base plate 28 by screws 39. Tubes 40 and 41 are respectively positioned at the opposite ends of the cylinder so that air alternately fed to these tubes reciprocates a piston 42 in the cylinder 38. When the pin 35 of the microswitch 34 is depressed by the roller arm 36, the microswitch in cooperation with conventional solenoids and valves (not shown) switches pressurized air from a central supply (not shown) to enter one or the other of the tubes 40 or 41 thereby driving the piston 42 rectilinearly in forward and rearward directions as indicated by arrows A and B, respectively, in FIG. 3. The reciprocating cycle of the piston 42 will of course be initiated each time the roller 37 rides onto, and off of, surface 32a.

Extending from the piston 42 is a piston rod 43 which serves as the sole driving member for a carriage 44 (FIG. 6). The carriage 44 is guided for rectilinear movement by the rails 24 and 25 and by the guide base plate 28, and comprises a yoke 45, a cam block or element 46 and a workpiece receiving block or work holder 47.

As shown in FIG. 5, the yoke 45 is threadedly connected to the rod 43 and can be adjusted relative thereto by merely rotating the rod. A nut 48 bears against the yoke 45 and serves to lock the adjustment, once made. The bifurcated ends of the yoke (FIGS. 1 and 5) are inserted into recesses 49 and 50 in the block 46 and are secured to the block by machine screws which are not shown for the purpose of clarity. The recesses 49 and 50 ensure proper positioning of the yoke 45 with respect to the cam block 46.

A T-shaped cam 51 (FIGS. 1, 4 and 5) is supported by blocks 46 and 47 and is urged in the forward direction (arrow A, FIG. 5) by a coil spring 52 housed in the block 46. The cam 51 together with cam block 46 form the camming elements of the device 10.

The cam 51 is limited in movement in this direction by a pair of lock nuts 53 and 54. These nuts also serve as the means for adjusting the position of the cam 51 with respect to the cam block 46. The block 46 is provided with an extending rod-shaped member 55, the end of which abuts a coil spring 56 housed in the receiving block 47. A bore 56a in the block 47 receives the spring 56, the latter effecting resilient engagement between the block 46 and the workpiece receiving block 47 upon movement of the block 46 in the direction of arrow A.

FIG. 4 shows in detail the cam 51 as being formed with a pair of slots 57 and 58 which together form a substantially V-shaped configuration. These slots (FIGS. 1 and 5) accommodate pins 59 and 60 connected to arms 61 and 62, respectively. The arms 61 and 62 are pivotably mounted by pins 63 and 64 to the block 47 (FIG. 1). Positioning pins 65 and 66 are slidably mounted in opposition in the ends of the arms 61 and 62 and are urged inwardly by leaf springs 67 and 68 attached to the arms. The leaf springs 67 and 68 ensure that resilient contact exists between the pins 65 and 66 and the workpiece 12.

A nest 69 is designed to accommodate the workpiece 12 such that the edges 13 and 14 of the workpiece 12 which are to be machined are properly presented to the cutter 11. The slot being somewhat larger than the workpiece, proper lateral positioning of the workpiece in block 47 is achieved by coaction between the positioning pins 65 and 66.

When the carriage 44 is in the loading position shown in FIG. 6, the cam 51 cooperating with the pins 59 and 60 urges the positioning pins 65 and 66 outwardly so that they do not interfere with the loading of the workpiece 12 in the nest 69. When the carriage 44 is in the clamping position shown in FIG. 5, the cam 51 will substantially abut the block 47 causing the slots 57 and 58 of the cam 51 to drive the pins 65 and 66 inwardly thereby locating the workpiece 12 in the nest 69.

It should be understood that the cam 51 could be fixed in the block 46 or the block provided with a surface having slots 57 and 58 therein thereby eliminating the spring 52 from the camming element. However, the spring 52 is preferably inserted between the cam 51 and the block 46 and the cam made slidable in the block 46 in order to reduce the possibility of cam breakage should foreign material fall between the block 47 and the cam. In addition, should there be over-travel of the cam 51 during movement of the cam block 46 into the block 47 (FIG. 5), the spring 52 will compress thereby preventing the pins 59 and 60 from exerting severe side thrusts against the slots 57 and 58.

As shown in FIGS. 3 and 5, a plate 71 fixed to the guide rails 24 and 25 by bolts (not shown) limits forward movement of the block 47. A cover 72 is fastened to the plate 71 by screws 73, and is designed to prevent cuttings resulting from the metal removing operation entering the tool 10.

Referring now to FIG. 5, the receiving block 47 is formed with a transverse bore 75 in an extension 76. The extension 76 and the rod member 55 extending from the cam block 46 can slide relative to each other. The bore 75 is large enough to receive a cylindrical pin 78 for sliding movement therein. The pin 78 is urged into contact with the member 55, as shown, by a pin 80 and a coil spring 81. The pins 78 and 80 are guided for sliding movement in the plate 28 by a bore 82. The pin 78 rides against the inclined surface of a slot 83 in the member 55 when the block moves in the direction of arrow B. The block 47 will remain fixed to the plate 28 until the slot 83 moving in the direction of arrow B admits a length of the pin 78 equal to that remaining in the bore 82. At that time, an end 85 of the slot 83 will abut the pin 78 and provide a connection between the blocks 46 and 47. Movement of the pin 78 into that part of the slot 83 adjacent the end 85 releases the block 47 from the base plate 28. It will be evident from the foregoing that the pin 78 not only serves to connect the block 47 to the guide rails at what will hereafter be referred to as the "clamping position" (FIG. 5), but also serves as a connection between the cam block 46 and the receiving block 47 on return movement of the device 10 to the loading position (FIG. 6).

As stated above, the carriage 44 is driven in the direction of arrow A by rectilinear movement of the rod 43. It will be understood that the coil spring 56 must exert sufficient force against the member 55 to prevent movement of the block 46 towards the block 47, otherwise the pin 78 may be forced into the base 28 by the slot 83. However, once the receiving block 47 abuts the plate 71 so that the bores 75 and 82 are substantially aligned, the compression of the coil spring 56 by the member 55 allows the member to drive the pin 78 into the bore 82 against the compression of the spring 81.

The support 30 mounts a clamping finger 91 for pivotal movement on a pin 92. The finger 91 will rotate in a counterclockwise direction, as viewed in FIG. 5, by engagement with an inclined cam surface 93 on the block 46 (FIG. 6). The function of the finger 91 is to clamp the workpiece securely against the shoulder 70 of the block 47. The finger 91 is tilted clockwise by a spring-biased pin 94 (FIG. 6), the amount of tilt being adjustable by a machine screw 95 in the support 30. By providing the correct amount of tilt, proper contact between the cam surface 93 on the block 46 and a surface 96 on the finger 91 is ensured.

An L-shaped leaf spring 98 is secured by means of a machine screw 97 to the finger 91. The free tip of the leaf spring is designed to contact the top surface of the receiving block 47 and eject the workpiece 12 from the nest 69 as the block moves from the clamping to the loading position. An opening 99 formed in the guide 28 receives the ejected workpiece and guides it into a chute 100.

The operation of the device 10 can be summarized as follows: The workpiece 12 is loaded by the operator into the nest 69 while the carriage is in the loading position of FIG. 6. At this time, and for safety reasons, the cutter 11 should not be proximate the clamping end of the device 10. The pins 59 and 60 will be urged inwardly by coaction between the slots 57 and 58 in the cam 51, and the positioning pins 65 and 66 extending from the arms 61 and 62 will be separated a distance sufficient to permit the insertion of the workpiece 12 into the nest 69.

Upon movement of the device 10 towards the cutter 11, the roller 37 (FIG. 9) rides upon the surface 32a of the rod 32 and the arm 36 actuates the microswitch 34. The microswitch 34 closes circuits which energize conventional solenoids (not shown) which in turn allow pressurized air to flow into the tube 41 (FIG. 3) from a conventional source (not shown). Pressurized air entering the tube 41 drives the piston 42 and the rod 43 in the forward direction. The carriage 44 is thusly driven towards the clamping position by the rod 43. The blocks 46 and 47 are driven by the yoke 45, the drive connection between the blocks being through the coil spring 56.

When the block 47 abuts the plate 71, the spring 56 cushions the block 46 and the cam 51 against impact and in turn is compressed in the bore 56a by the member 55. The pin 78 is thereupon driven into the bore 82 in the base 28 through the action of the spring 81, pin 80 and the inclined surface of the slot 83. During compression of the spring 56, relative movement occurs between the block 46 and the cam 51 as the latter approaches the block 47, as shown in FIG. 5. There is also relative movement between the pins 59 and 60 and the cam 51 since the pins 59 and 60 are mounted on the block 47. As the spring 56 is compressed, the arms 61 and 62 drive the pins 65 and 66 inwardly to position the workpiece 12 in the nest 69 prior to the clamping operation.

Clamping is achieved by the finger 91 being rotated by the block 46 until the workpiece is firmly clamped against the shoulder 70 of the block 47. Thereafter, the device 10 carries the workpiece 12 transversely across the cutter 11, the cutter thereupon effecting the metal removing operation upon the edges 13 and 14. The device 10 is then driven to return to the position where the workpiece was initially clamped. Just prior to the device 10 being returned to this position, the roller 37 rides off the rod 32 releasing the spring-biased pin 35 to initiate the solenoids (not shown) so that they can effectively switch the air supply from the tube 41 to the tube 40. The spring 56 expands until the end 85 of the slot 83 abuts the pin 78 and the block 46 releases the finger 91 from clamping the workpiece 12.

When the block 46 contacts the lock nut 53, the cam 51 will also be carried with the block 46 in the rearward direction. Since the block 47 will remain fixed to the guide 28 for a relatively short time after contact is made between the nut 53 and the block 46, there will be relative movement between the cam 51 and the arms 61 and 62. This movement is sufficient to drive the positioning pins 65 and 66 outwardly and from contact with the finished workpiece. Upon additional movement of the block 46, the pin 78 will be pushed upwardly by the pin 80 and the spring 81 to release the block 47 from the base 28, and the block 47 will return to the loading position with the block 46.

During rearward travel of the block 47, the leaf spring 98 will contact the finished workpiece 12 and eject it from the nest 69 so that it falls into the opening 99.

In summary, it should now be apparent that forward and rearward rectilinear motion of the carriage 44 by a single actuating member, such as the piston 42, effects the transfer, positioning, clamping and ejection of the workpiece. While piston reciprocation represents a preferred manner for driving the carriage, it will be evident to those in the art that other mechanism capable of producing the required reciprocating action may also be employed and are therefore within the contemplation of this invention. Also, and for reasons stated above, the camming element may be made integral.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A work-holding device comprising:
a work holder;
mounting means for supporting said holder for longitudinal movement;
an element mounted on said holder for longitudinal movement therewith and for limited longitudinal movement relative thereto;
resilient means for urging said element in a direction from said holder to an extended position;
a clamping member movably supported on said mounting means;
means for stopping the longitudinal movement of said holder in an operative position beneath said clamping member;
means on said mounting means for actuating said element to effect the longitudinal movement of said work holder from a loading position to the operative position and the subsequent movement of said element relative to said holder from the extended position; and
means on said element operable in response to movement of said element relative to said holder from the extended position to effect the actuation of said clamping member to clamp the work to said holder.

2. A device as defined in claim 1 including means on said clamping member for removing the work from said holder in response to movement of said holder from the operative position to the loading position.

3. A work-holding device comprising:
a work holder;
mounting means for supporting said work holder for longitudinal movement;
an element mounted on said holder for longitudinal movement therewith and for limited longitudinal movement relative thereto;
resilient means for urging said element in a direction from said holder to an extended position;
a clamping member movably supported on said mounting means;
a pair of members mounted on said holder for movement toward each other to position the work therebetween;
means for stopping the longitudinal movement of said holder in an operative position beneath said clamping member;
means on said mounting means for actuating said element to effect the longitudinal movement of said work holder from a loading position to the operative position and the movement of said element relative to said holder from the extended position;
cam means on said element operable in response to movement of said element relative to said holder from the extended position to effect the actuation of said clamping member to clamp the work to said holder; and
means responsive to the movement of said element relative to the holder from the extended position for actuating said work-positioning members.

4. A device as defined in claim 3 including means responsive to the movement of said element relative to said holder from said extended position to releasably lock said holder to said mounting means at said operative position and responsive to movement of said element relative to said holder to said extended position to release said holder.

5. A device of the type described comprising:
a work holder;
mounting means for supporting said work holder for longitudinal movement;
an element mounted on said holder for longitudinal movement therewith and for limited longitudinal movement relative thereto;
resilient means for urging said element in a direction from said holder to a normal extended position;
a clamping member pivotally supported on said mounting means;
a pair of members pivotally mounted intermediate their ends on said holder for movement of one end portion of each toward the other to position the work therebetween;
means for stopping the longitudinal movement of said holder in one direction in an operative position beneath said clamping member;
means on said mounting means for reciprocating said element to effect the longitudinal movement of said holder from a loading position to the operative position and the movement of said element relative to said work holder from the extended position;
cam means on said element operable in response to movement of said element relative to said holder to effect the pivoting of the clamping member to clamp the work to said holder; and
cam means movable with said element and engaging the other end of each of said positioning members for actuating said members in response to the movement of said element relative to said holder.

6. A device as defined in claim 5 including a member mounted on said clamping member and actuated thereby into engagement with said holder for removing the work therefrom in response to movement of said holder from said operative position.

7. A device of the type described comprising:
a work holder;
mounting means for supporting said work holder for longitudinal movement;
an element mounted on said holder for longitudinal movement therewith and for limited longitudinal movement relative thereto;

resilient means for urging said element in a direction from said holder to a normal extended position;

a clamping member pivotally supported on said mounting means;

a pair of members pivotally mounted intermediate their ends on said holder for movement of one end portion of each toward the other to position the work therebetween;

means for stopping the longitudinal movement of said holder in one direction in an operative position beneath said clamping member;

means on said mounting means for reciprocating said element through a predetermined distance to effect the longitudinal movement of said holder from a loading position to the operative position and the movement of said element relative to said work holder from the extended position;

cam means on said element operable in response to movement of said element relative to said holder to effect the pivoting of the clamping member to clamp the work to said holder;

cam means movable with said element and engaging the other end of said pivoting members for actuating said members in response to the movement of said element relative to said holder;

a member mounted on said clamping member and actuated thereby into engagement with said holder for removing the work therefrom in response to movement of said holder from said operative position; and means responsive to the movement of said element relative to said holder from said extended position to releasably lock said holder to said mounting means at said operative position and responsive to movement of said element relative to said holder to said extended position for releasing said holder.

8. A device of the type described comprising:

a carrier mounted for movement along a predetermined first path in adjacency to a tool for processing work;

a work holder mounted on said carrier for movement therewith and for longitudinal movement relative thereto along a second path transversely of said first path;

an element mounted on said holder for longitudinal movement therewith and for limited longitudinal movement relative thereto;

resilient means for urging said holder and said element from each other to a normal extended position;

a clamping member pivotally supported on said carrier;

means on said carrier for stopping the movement of said holder in one direction in an operative position beneath said clamping member;

a locking pin slidably mounted on said holder and operable in a first position for limiting the movement of said element relative to said holder to the extended position and operable in a second position for locking said holder in fixed relation to said carrier;

means on said carrier for reciprocating said element to effect the longitudinal movement of said holder from a loading position to the operative position and the movement of said element relative to said holder from the extended position;

means on said element for actuating said clamping member to effect the clamping of the work onto said holder in response to movement of said element relative to said holder from said extended position; and means responsive to the movement of said element relative to said holder from said extended position for moving said locking pin to said second position and responsive to the movement of said element relative to said holder to said extended position for moving said locking pin to said first position.

9. A device of the type described comprising:

a carrier mounted for movement along a predetermined first path in adjacency to a tool for processing a workpiece;

a first member mounted on said carrier for movement therewith and for longitudinal movement relative thereto along a second path transversely of said first path and having a seat for supporting the workpiece;

a second member connected to said first member for longitudinal movement therewith and for limited longitudinal movement relative thereto;

resilient means for urging said first and second members from each other to a normal extended position;

a clamping member pivotally supported on said carrier;

stop means on said carrier for arresting the movement of said first member in one direction in an operative position beneath said clamping member;

a locking pin slidably mounted on said first member and operable in a first position for limiting the movement of said second member relative to said first member to the extended position and operable in a second position for locking said first member in fixed relation to said carrier;

a pair of movable elements on said first member for engaging opposite sides of the workpiece and positioning the workpiece in a predetermined location on said first member;

means responsive to the movement of said second member relative to said first member from said extended position for actuating said work positioning elements;

means on said carrier for reciprocating said second member to effect the longitudinal movement of said first member from a loading position to the operative position and the movement of said second member relative to said first member from the extended position;

means on said second member for actuating said clamping member to effect the clamping of the workpiece onto said first member in response to movement of said second member relative to said first member from said extended position; and means responsive to the movement of said second member relative to said first member from said extended position for moving said locking pin to said second position and responsive to the movement of said second member relative to said first member to said extended position for moving said locking pin to said first position.

References Cited by the Examiner

UNITED STATES PATENTS

| | | | |
|---|---|---|---|
| 1,938,771 | 12/33 | Archea | 90—59.1 |
| 2,357,128 | 8/44 | Parks | 90—59.1 |
| 2,420,665 | 5/47 | Jorgensen | 90—59.1 |
| 2,622,488 | 12/52 | Payne | 90—59.1 |

ROBERT C. RIORDON, *Primary Examiner.*